(12) United States Patent
Sherer et al.

(10) Patent No.: US 12,432,220 B2
(45) Date of Patent: Sep. 30, 2025

(54) DORMANT SERVICE ACCOUNT DISABLEMENT SYSTEM

(71) Applicant: Bank of America Corporation, Charlotte, NC (US)

(72) Inventors: Melody Wilkins Sherer, Alexis, NC (US); Christina Finnell Clark, Terrell, NC (US); Derek Jia Liang Feng, Colma, CA (US); Jack T. Lockamy, Carrollton, TX (US); Ryan Bondura Essa, Jacksonville, FL (US); Jonathan Thole, Denver, CO (US)

(73) Assignee: Bank of America Corporation, Charlotte, NC (US)

( * ) Notice: Subject to any disclaimer, the term of this patent is extended or adjusted under 35 U.S.C. 154(b) by 166 days.

(21) Appl. No.: 18/133,878

(22) Filed: Apr. 12, 2023

(65) Prior Publication Data

US 2024/0348617 A1   Oct. 17, 2024

(51) Int. Cl.
| | |
|---|---|
| *H04L 9/40* | (2022.01) |
| *G06F 21/50* | (2013.01) |
| *G06Q 40/02* | (2023.01) |

(52) U.S. Cl.
CPC ........... *H04L 63/108* (2013.01); *G06F 21/50* (2013.01); *G06Q 40/02* (2013.01); *H04L 63/102* (2013.01); *H04L 63/1408* (2013.01); *H04L 63/1441* (2013.01)

(58) Field of Classification Search
CPC ..... H04L 63/102; H04L 63/10; H04L 63/108; H04L 63/20; H04L 63/1408; H04L 63/1425; H04L 63/1441; H04L 9/002; G06Q 40/02; G06F 21/50
See application file for complete search history.

(56) References Cited

U.S. PATENT DOCUMENTS

| | | | |
|---|---|---|---|
| 8,503,634 B1 * | 8/2013 | Townsend, III | ....... G06Q 40/02 379/114.04 |
| 9,167,047 B1 | 10/2015 | Sharma et al. | |
| 9,485,271 B1 | 11/2016 | Roundy et al. | |
| 10,257,201 B2 | 4/2019 | Parees et al. | |
| 10,567,388 B1 * | 2/2020 | Kruse | ..................... H04L 63/10 |
| 10,944,759 B2 | 3/2021 | Hidden et al. | |
| 11,526,385 B1 * | 12/2022 | Mannar | ................. G06F 9/4881 |
| 11,615,350 B2 | 3/2023 | Wisniewski | |

(Continued)

*Primary Examiner* — Shaqueal D Wade-Wright
(74) *Attorney, Agent, or Firm* — Banner & Witcoff, Ltd.

(57) ABSTRACT

Various aspects of the disclosure relate to identifying and disabling dormant service accounts. An account management system automatically analyzes service account activity records to determine whether each service account defined for an enterprise network is in use. Automated monitoring applications may be used for identifying and authenticating events and/or authentications of service accounts across an enterprise network. When particular service accounts are identified as being potentially dormant, based on an identified date of last use meeting a threshold condition, the associated service accounts are flagged as being dormant. Setting an account as being dormant triggers solicitation of feedback confirming the dormant setting, which causes disablement of the service account. The account management system triggers decommissioning of the dormant service accounts upon expiration of a disablement threshold.

20 Claims, 4 Drawing Sheets

(56) References Cited

U.S. PATENT DOCUMENTS

| | | | |
|---|---|---|---|
| 2009/0137225 A1* | 5/2009 | Costanzo | H04W 4/90 |
| | | | 455/405 |
| 2017/0063873 A1* | 3/2017 | Hidden | H04L 63/105 |
| 2019/0394240 A1 | 12/2019 | Israel et al. | |
| 2020/0169529 A1 | 5/2020 | Teverovsky et al. | |
| 2021/0157907 A1* | 5/2021 | Argoety | G06F 21/552 |
| 2022/0060479 A1* | 2/2022 | Perkins | H04L 63/083 |
| 2022/0391927 A1* | 12/2022 | Jain | H04L 63/1441 |
| 2023/0004556 A1 | 1/2023 | Campbell et al. | |

\* cited by examiner

DORMANT SERVICE ACCOUNT DISABLEMENT SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, it may be difficult for such an organization, such as a financial institution, to efficiently, effectively, securely, and uniformly manage its computer systems, and particularly manage how internal computer systems exchange information with external computer systems in providing and/or supporting different products and services offered by the organization. For example, an enterprise computing network may utilize service accounts (e.g., machine accounts) when providing computerized products or services. However, because service accounts may be utilized for testing or limited uses, a user management system may store including features of an account manager, which may include features of an identity management system.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer hardware and software. Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like). In particular, one or more aspects of the disclosure generally relate to computer hardware and software for identifying dormant service accounts and automatically managing disabling and/or enabling the dormant service accounts based on identified metrics.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes automated identification of dormant service accounts, automatically soliciting information confirming service account dormancy, before automatically initiating and performing a disablement and/or decommissioning process.

In some cases, a computing system may automatically process a policy that requires that service be assessed and while also scanning historical application use and/or account activity records looking to determine whether each service account defined for the enterprise network is in use. The directory system provides a date of last use as provided by the platform using the account. However, that last use date cannot be relied upon, so an automated scanning application is used to look backwards at historical information (e.g., 60 days, 90 days, 180 days and the like) of activity. Automated monitoring applications may be used for identifying and authenticating events and/or authentications of service accounts across an enterprise network. If the monitoring application identifies validated and logged event and/or authentication activities associated with the service accounts, then the service accounts have been validated as active and are not classified as being dormant. The monitoring application may compare the event log information and authentication log information to the "last known use" date provided by the directory server to further enrich the decision of whether particular service accounts are active or dormant. In some cases, once dormant accounts are identified, the identification of a dormant account may trigger solicitation of feedback from a user indicated as being responsible for that account. For example, a survey system may cause a message to be presented on a user interface of a user device where a positive input received in response to a query confirming account dormancy causes initiation of a disablement process and a negative input indicating that the service account is still in use causes a process to ensure the service account remains enabled.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

In current computing networks, management of service accounts, including identification, disabling, and decommissioning dormant service accounts required manual intervention to process different portions of the process. Dormant service accounts represent a large financial, technical and security risk for enterprise networks. For example, current monitoring processes that are used to identify whether service accounts are used efficiently and/or decommissioned as needed are time and computing power intensive, particularly for growing or large enterprise networks. For example, certain directory services may not be able to accurately log a date of last use of a service account due to a number of reasons including, for example, a method of use by particular applications. In some cases, automated dormant service account management applications and/or systems include processes that continuously operate to identify, monitor, and manage disablement of dormant service account, such as by running a periodic (e.g., daily, weekly, biweekly) automated job. Accordingly, the automated process may reduce the number of resources required to manage and/or monitor the jobs during processing of disabling service accounts by a factor of four, such as by removing (e.g., decommissioning) dormant service accounts. In an illustrative example, an enterprise organization may initially have over two hundred and fifty thousand service accounts enabled in the directory service (e.g., active directory). After an automated dormant service account management system may reduce risks associated with dormant service accounts by disabling a high percentage (e.g., approximately 50% or one hundred and fifty thousand) of service accounts.

In some cases, the automated dormant service account management system may include an automated feedback solicitation applications (e.g., an automated survey system) that surveys service account owners, or others responsible for service account operations, to confirm that any automatically identified dormant service accounts can be disabled and decommissioned. The survey system may store a historical record of operations performed during a service account disablement and/or decommissioning (e.g., identification of a dormant service account, approval for disablement of the dormant service account, evidence that the disabled service account was recoverable for a defined period of time, and the like) for use as an audit trail. The automated dormant service account management system may further include a risk analysis system that may provide deliverables (e.g., information to support self-identification of issues, identified key portfolio risk trends, and the like) that may be provided or otherwise assigned to the account owners to facilitate completion of the survey. Once that the automated dormant service account management system confirms that a job has run according to a schedule (e.g., weekly on Friday) to auto disable the service accounts, the system also manages a process to address service accounts that are missing owners, in cases that the scan has identified that the service account has no recent logged activities. To do so, multiple data sources may be joined together to update systems of record with a record of the service account's status, thus allowing disablement and/or decommissioning of service accounts to operate autonomously.

Dormant service accounts, in addition to adding processing overhead to searches that reduces overall computational efficiency of the enterprise network, requiring additional memory for storage of service account information, dormant service accounts may be vulnerable to unauthorized use by malicious actors. For example, a malicious actor may obtain a password to allow access to the service account operations, which may allow this individual to modify code, change operation of a service or services associated with the service account, or otherwise access private information on the enterprise network. By disabling dormant service accounts that have aligned passwords, the automated dormant service account management system reduces the risk that someone that might obtain the password and attempt to use the otherwise dormant service the account for unauthorized uses. Additionally, dormant service accounts may be re-purposed for other internal actions or to provide a different service functionality, which may cause issues during regulatory required audits. Removing dormant service accounts from an enterprise computing environment reduces overall security and/or regulatory risks. Additionally, cost savings are realized when the detection tools are scanning the environment for vulnerabilities because when dormant service accounts are disabled, the scanned volume within the environment is reduced, thus improving efficiencies of the scanning tools which in turn reduces computational costs and/or computational times and causing an overall reduction in scanning the account system.

Figure 1A:
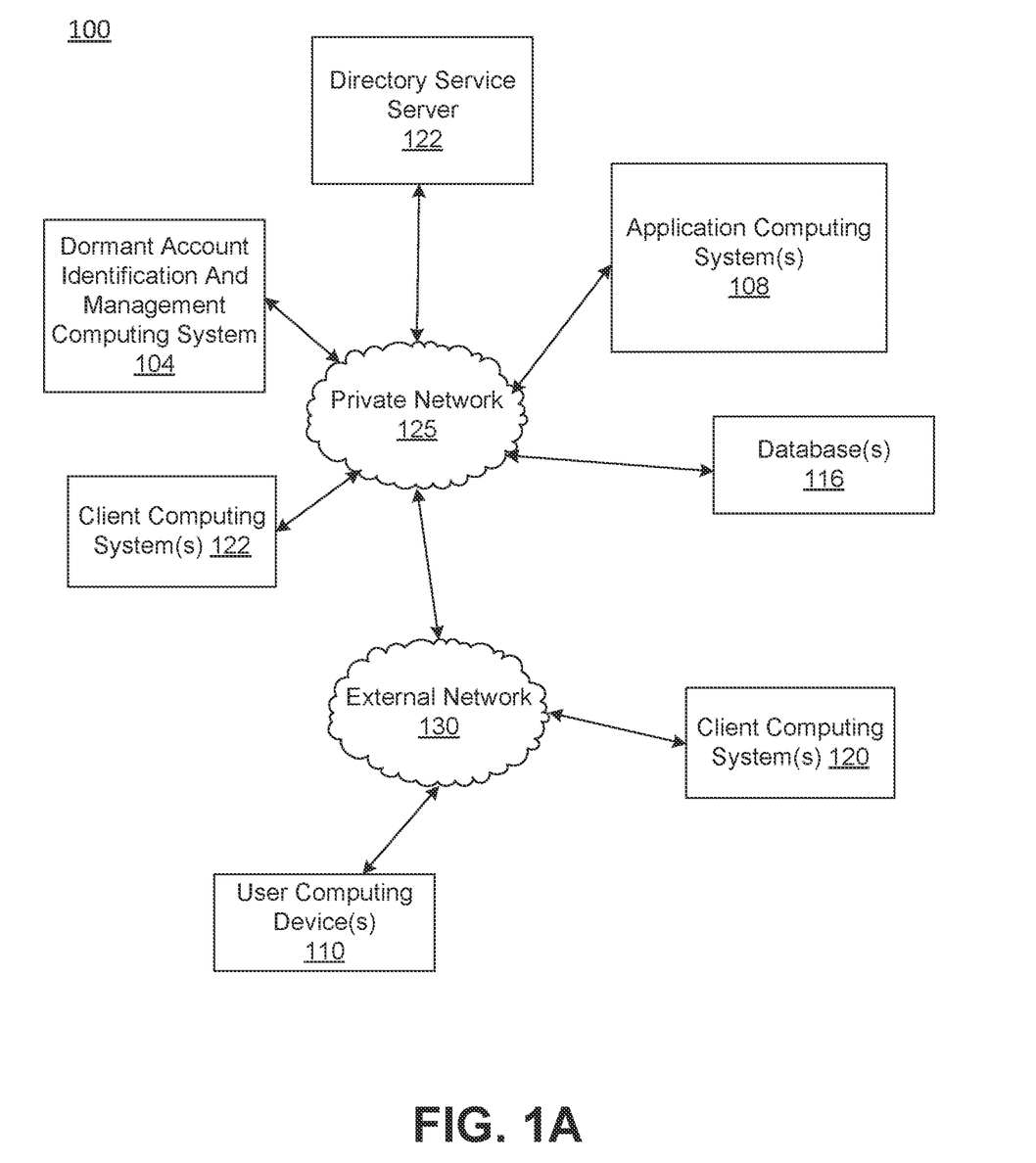
FIG. 1A shows an illustrative computing environment for automatically identifying and disabling dormant service accounts, in accordance with one or more aspects described herein.

FIG. 1A shows an illustrative computing environment 100 for monitoring service account usage and automatically disabling dormant service accounts, in accordance with one or more arrangements. The computing environment 100 may comprise one or more devices (e.g., computer systems, communication devices, and the like). The computing environment 100 may comprise, for example, a dormant account identification and management computing system 104, one or more application computing systems 108, a directory service server 122, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a client computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the dormant account identification and management computing system 104 as being separate from the directory service server 122 and the application computing systems 108, portions of the dormant account identification and management computing system 104 may be implemented within one or more of the directory service server 122 and the application computing systems 108.

The dormant account identification and management computing system 104 may comprise one or more computing devices and/or other computer components (e.g., processors, memories, communication interfaces) configured to perform one or more functions as described herein. Further details associated with the architecture of the dormant account identification and management computing system 104 are described with reference to FIG. 1B.

The application computing systems 108 and/or the client computing systems 120 may comprise one or more computing devices and/or other computer components (e.g., processors, memories, communication interfaces). In addition, the application computing systems 108 and/or the client computing systems 120 may be configured to host, execute, and/or otherwise provide one or more enterprise applications. In some cases, the application computing systems 108 may host one or more services configured facilitate operations requested through one or more API calls, such as data retrieval and/or initiating processing of specified functionality. In some cases, the client computing systems 120 may be configured to communicate with one or more of the application computing systems 108 such as via direct communications and/or API function calls and the services. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, and/or other programs associated with the financial institution. The application computing systems 108 and/or the client computing systems 120 may comprise various servers and/or databases that store and/or otherwise maintain account information, such as financial account information including account balances, transaction history, account owner information, and/or other information. In addition, the application computing systems 108 and/or the client computing systems 120 may process and/or otherwise execute transactions on specific accounts based on commands and/or other information received from other computer systems comprising the computing environment 100. In some cases, one or more of the application computing systems 108 and/or the client computing systems 120 may be configured, for example, to host, execute, and/or otherwise provide one or more transaction processing programs, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, an application computing system 108 may be linked to and/or operated by a specific enterprise user or service account (who may, for example, be an employee or other affiliate of the enterprise organization) who may have administrative privileges to perform various operations within the private network 125. In some cases, the application computing systems 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing systems 120 may comprise one or more computing devices and/or other computer components (e.g., processors, memories, communication interfaces). The client computing systems 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing systems 120 is for processing an electronic exchange of goods and/or services. The client computing systems 120 may be associated with a specific goods purchasing activity, such as purchasing a vehicle, transferring title of real estate may perform communicate with one or more other platforms within the client computing systems 120. In some cases, the client computing system 120 may integrate API calls to request data, initiate functionality, or otherwise communicate with the one or more application computing systems 108, such as via the services. For example, the services may be configured to facilitate data communications (e.g., data gathering functions, data writing functions, and the like) between the client computing systems 120 and the one or more application computing systems 108.

The user device(s) 110 may be computing devices (e.g., desktop computers, laptop computers) or mobile computing device (e.g., smartphones, tablets) connected to the private network 125. The user device(s) 110 may be configured to enable the user to access the various functionalities provided by the devices, applications, and/or systems in the private network 125.

The database(s) 116 may comprise one or more computer-readable memories storing information that may be used by the dormant account identification and management computing system 104. For example, the database(s) 116 may store service account usage information, lists of identified dormant service accounts, associations of users responsible for applications and/or associated service accounts, and the like. In an arrangement, the database(s) 116 may be used for other purposes as described herein. In some cases, the client computing system 120 may write data or read data to the database(s) 116 via the services.

In one or more arrangements, the dormant account identification and management computing system 104, the application computing systems 108, the directory service server 122, the client computing systems 120, the user devices 110, and/or the other devices/systems in the computing environment 100 may be any type of computing device capable of receiving input via a user interface, and communicating the received input to one or more other computing devices in the computing environment 100. For example, the dormant account identification and management computing system 104, the application computing systems 108, the directory service server 122, the client computing systems 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the dormant account identification and management computing system 104, the application computing systems 108, the directory service server 122, the client computing systems 120, the user devices 110, and/or the other devices/systems in the computing environment 100 may, in some instances, be and/or comprise special-purpose computing devices configured to perform specific functions.

Figure 1B:
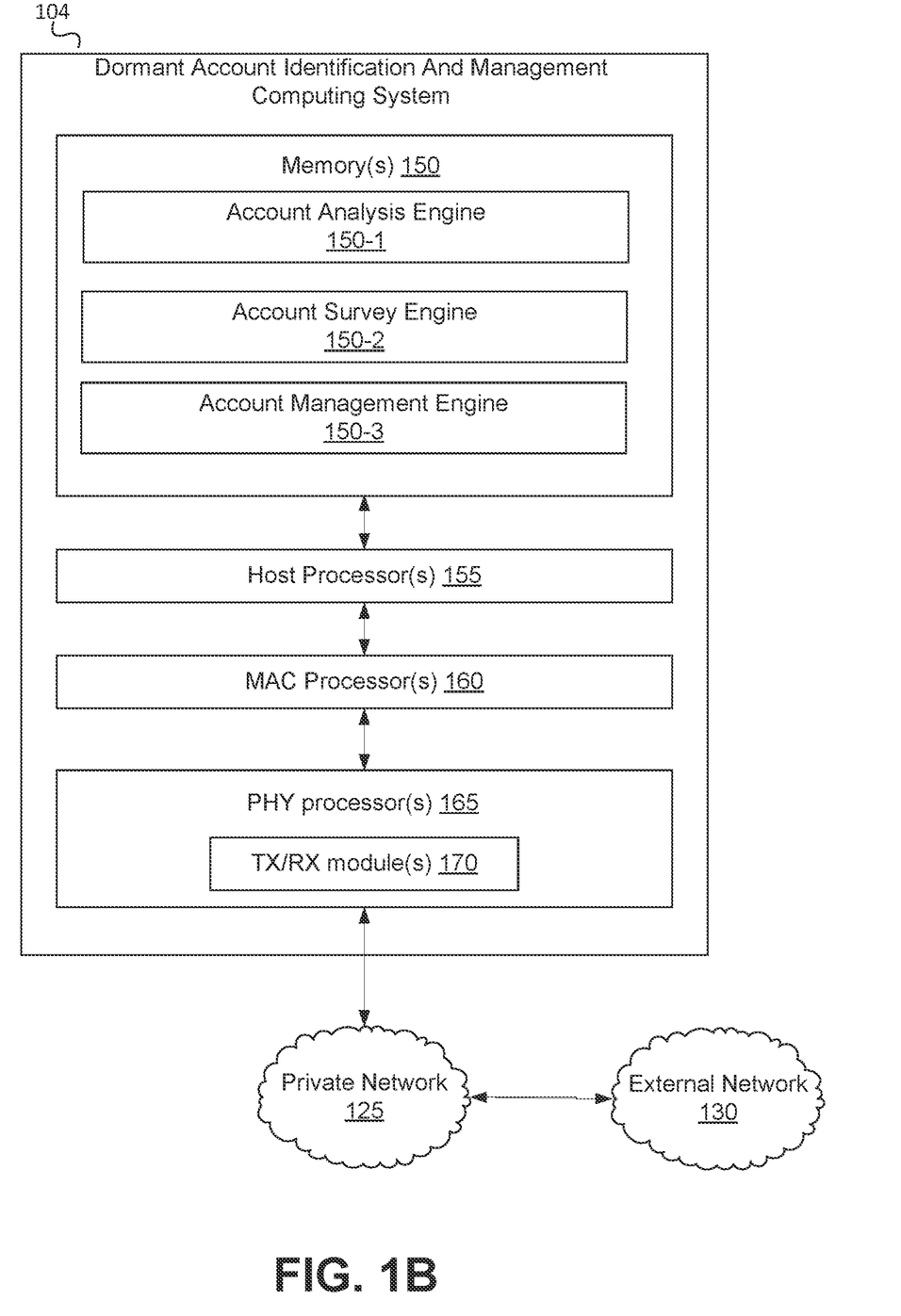
FIG. 1B shows an illustrative computing platform enabled for automatically identifying and disabling dormant service accounts, in accordance with one or more aspects described herein.

FIG. 1B shows an illustrative dormant account identification and management computing system 104 in accordance with one or more examples described herein. The dormant account identification and management computing system 104 may be a stand-alone device and/or may at least be partial integrated with the dormant account identification and management computing system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The dormant account identification and management computing system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the dormant account identification and management computing system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 170, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the dormant account identification and management computing system 104 may be configured to execute machine readable instructions stored in memory 150. The memory 150 may comprise (i) one or more program modules/engines having instructions that when executed by the one or more processors cause the dormant account identification and management computing system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the dormant account identification and management computing system 104 and/or by different computing devices that may form and/or otherwise make up the dormant account identification and management computing system 104. For example, the memory 150 may have, store, and/or comprise an account analysis engine 150-1, an account survey engine 150-2, an account management engine 150-3 and/or the like. The account analysis engine 150-1 may have instructions that direct and/or cause the dormant account identification and management computing system 104 to monitor service account use and generate lists of potential dormant service accounts. The account survey engine 150-2 may have instructions that may cause the dormant account identification and management computing system 104 to automatically generate surveys to solicit and analyze feedback regarding use of the identified potential dormant service accounts. The account management engine 150-3 may have instructions that may cause the dormant account identification and management computing system 104 to automatically disable and/or re-enable dormant accounts.

While FIG. 1A illustrates dormant account identification and management computing system 104, the directory service server, and/or the application computing systems 108, as being separate elements connected in the private network 125, in one or more other arrangements, functions of one or more of the above may be integrated in a single device/network of devices. For example, elements in the dormant account identification and management computing system 104 (e.g., host processor(s) 155, memory(s) 150, MAC processor(s) 160, PHY processor(s) 165, TX/RX module(s)

170, and/or one or more program/modules stored in memory(s) 150) may share hardware and software elements with and corresponding to, for example, the directory service server, and/or the application computing systems 108.

Figure 2:
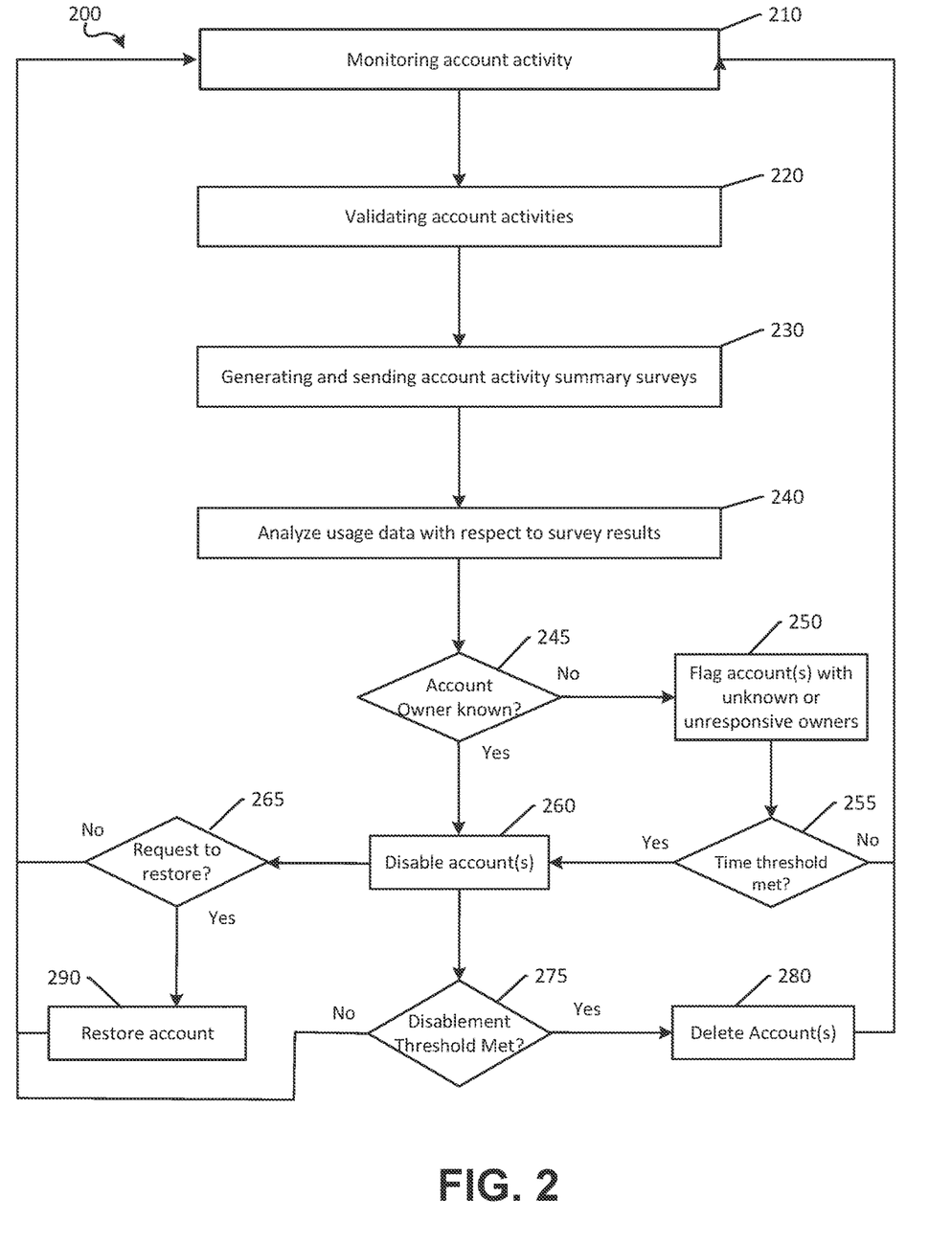
FIG. 2 shows illustrative process for managing service accounts in accordance with one or more aspects described herein.
Figure 3:
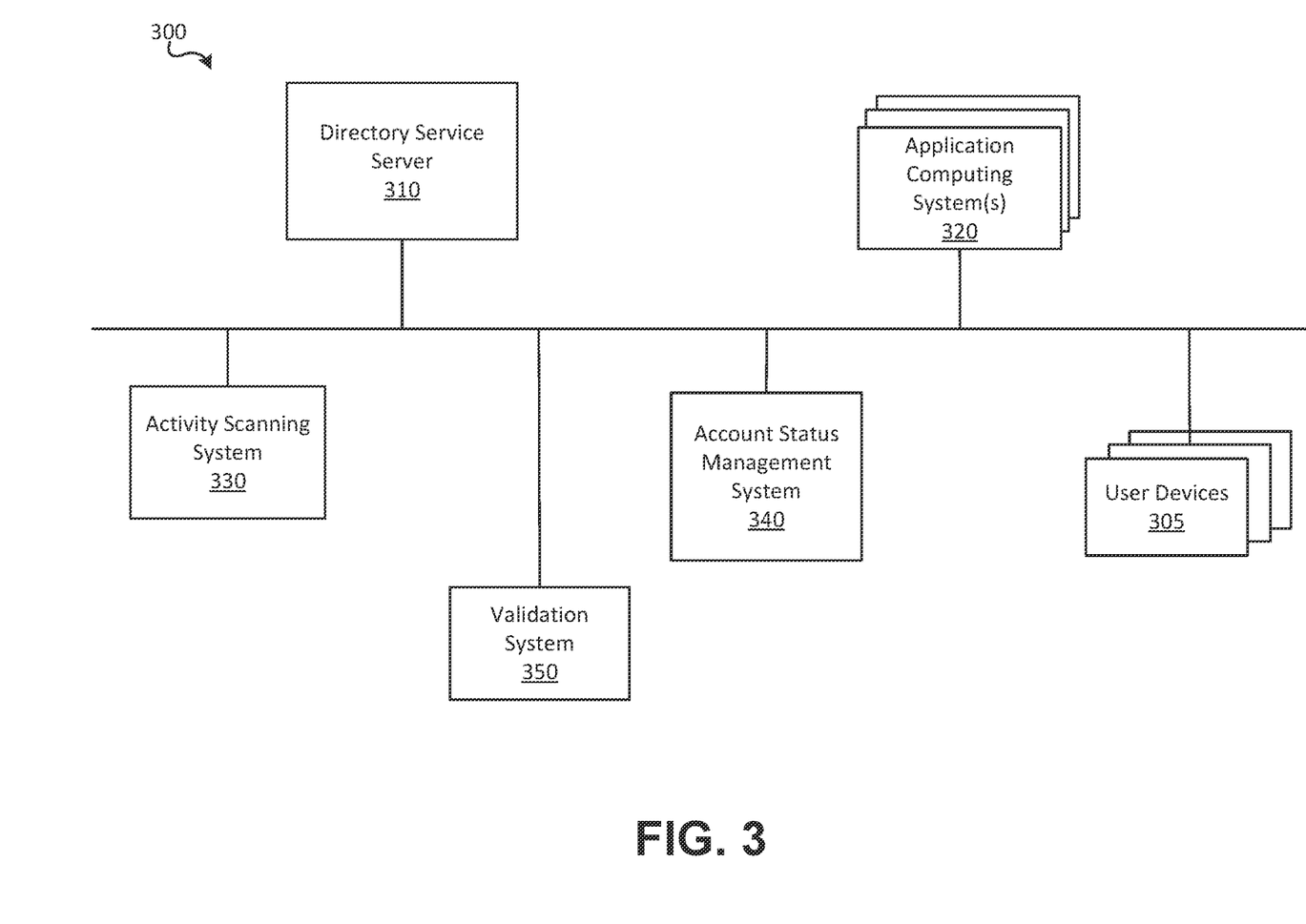
FIG. 3 shows an illustrative system processing a method for managing service accounts, in accordance with one or more example arrangements.

FIG. 2 shows illustrative process 200 for managing service accounts and FIG. 3 shows an illustrative system 300 performing the process for managing service accounts in accordance with one or more example arrangements. The system 300 includes one or more user devices 305, a directory service server 310, one or more application computing systems 320, an activity scanning system 330, an account status management system, and a validation system 350.

The directory service server 310, such as an active directory server, may provide domain controller functionality to provide associate and computer authentication, authorization, and/or configuration services. The directory service server 310 may include a framework of applicable services and/or may implement policies of an enterprise to provide user access to enterprise resources including applications, files, and data. identify, authenticate, and authorize users and hardware of an enterprise and permit appropriate access to enterprise resources in a computer network. In some cases, the directory service server 310 may authenticate a user and a user's computing device such as via a secure log in to a network. In some cases, the directory service server 310 may authenticate a service account that may be used to automate one or more services and/or processes implemented within the enterprise network, such as on the application computing systems 108. The directory service server 310 may apply a set of policies to server accounts to permit access to applications or data depending on whether the service account has permission to access the application or data. Additionally, the directory service server 310 may provide other functionalities, such as provisioning user and/or service accounts, tracking use of the accounts, and/or logging events or operations performed by the user or service accounts. A database associated with the directory server may store data for each user account and/or service account identity authentication information, service account ownership or oversight responsibility information, password and/or other security information, and permissions information concerning actions each particular user account and/or service account is authorized to access or perform with the network resources.

The application computing systems 320 (e.g., the application computing systems 108) may include one or more applications, processes, services operating within the enterprise network. Additionally, the application computing systems 320 may include an application inventory tool that manages information associated with application ownership, application lifecycle information (e.g., testing, in-operation, retired, and the like), account affiliations, and the like. Further, the application computing systems 320 may include internal automated functionalities and/or processes and/or services provided to customers of the enterprise organization. In some cases, the application computing systems 320 may include custom applications that require access to network resources and/or provide specified functionalities without user interaction. In some cases, an application may utilize a service accounts created and/or managed as a resource associated with the specified application, where the application fails to operate when the service account is disabled or otherwise inaccessible. As such, dormancy of a service account may be an indication that the associated application may no longer be utilized or operational. Each service account may be granted access to networked resources to perform operations required by the associated application computing systems 320. However, a service account may also be accessed and/or impersonated by other individuals, which may result in a security vulnerability. For example, an improperly accessed service account may be used in a privilege escalation scenario where a malicious actor may impersonate a service account to gain unauthorized access to network resources. Additional vulnerabilities that may be caused by a misused service account includes spoofing, non-repudiation, improper information disclosure, and the like. As such, automated disablement and/or deactivation of dormant service accounts, not only improves overall network efficiency, but also improves overall network security by minimizing service account based vulnerabilities.

The activity scanning system 330 may be used to scan, monitor, and log activities associated with service accounts, where the assembled information may be stored for a period of time. In some cases, historical logged information may be accessed by other systems, such as the account status management system 340, to identify whether particular service accounts are still operational or have gone dormant. In some cases, the account status management system 340 may analyze historical data within a defined time period (e.g., 180 days) when determining that a particular service account is now dormant. The account status management system 340 may interact with the other systems illustrated in FIG. 3 to autonomously deactivate and/or decommission identified dormant service accounts. For example, the validation system 350 may automatically be provided with a list of service accounts temporarily indicated as being dormant. Receipt of the list of potential dormant service accounts may trigger the validation system 350 to communicate a dormancy validation survey to a user device of the user devices 305 that is associated with a particular dormant service account within the list. For example, the validation system 350 may automatically parse the list received from the account status management system 340 to identify a responsible user or department for each dormant service account.

Once identified, the validation system 350 may cause presentation of the survey on a user interface of the appropriate user device to solicit a confirmation input or a negation input that either confirms or refutes the dormancy designation for that particular service account. Upon entry, the validation system 350 communicates survey results (either when individual received, or as a batch) to the account status management system 340. Once received, the account status management system 340 may then automatically initiate a disablement and decommissioning process for the associated service account upon receipt of a confirmation indication. If, the survey indicates the service account is still in use, the account status management system 340 may then remove the service account from the list, so that the service account remains active. In some cases, the account status management system 340 may continuously manage scanning operations performed by the activity scanning system 330, validation operations of the validation system 350, such that identification of dormant service accounts is an autonomous process. Throughout the process, the account status management system 340 may classify service accounts based on aggregated and analyzed event and activity information associated with each service account as well as feedback received (or not received) from individuals responsible for operation of processes that utilize the service accounts. In some cases, the feedback may be automated such that each application may be configured to respond to queries corresponding to the service accounts associated with their operation. The account status management system 340 may monitor groups of service accounts indicated as being active, groups of service accounts indicated as being dormant, and may maintain a listing disabled service accounts preserving the option to re-enable the account before decommissioning once the threshold condition has been met.

Returning to FIG. 2, a dormant service account identification and decommissioning process may, at 210, include monitoring service account activities and/or events logged within the enterprise network. Here, the activity scanning system 330 may aggregate event log information from one or more sources (e.g., the directory service server 310, the application computing systems 320, and the like) to generate a historical record of service account activity for all service accounts within the enterprise network. For example, the directory service server 310 may communicate a listing of each service account managed by the directory service server 310, including status information (e.g., active, disabled). The activity scanning system 330 may then build historical data records associated with events or other activities logged for each of the service accounts. At 220, a date of last use provided by the performed by the directory service server may be compared to event and/or activity information aggregated by the activity scanning system 330 to validate whether the data of last use was accurate. At 230, the account status management system 340 may generate a list of potential dormant service accounts based on the validated activity information, where each dormant service account on the list may have been dormant for at least a specified duration (e.g., 90 days, 180 days, 200 days, or the like). The list may then be used by the validation system 350 to trigger generation of the account activity surveys used to validate identification of dormant service accounts.

At 240, the account status management system 340 may analyze service account utilization information with respect to survey results. If a survey indicates that a service account on the dormancy list was still active, then the account status management system 340 removes that service account from the list. In some cases, the account status management system 340 may then reset a time duration for that service account to ensure that service account remains active. In some cases, service accounts previously indicated as potential dormant accounts may have a same or shorter time threshold within which the activity scanning system 330 looks for activity by that account. If a service account has been confirmed to be dormant and has been disabled, event activity associated with that account is removed from monitoring. In some cases, identification of a potentially dormant account may be used by the account status management system 340 to pause monitoring of the potentially dormant account.

At 245, the account status management system 340 may, for service accounts confirmed to be disabled or otherwise remaining on the list, determine whether a responsible owner was known and provided a response. If yes, the corresponding service accounts are disabled at 260. For example, the account status management system 340 may cause the directory service server 310 to set a flag indicating that the service account has been disabled. That flag may also cause the service account to be inoperable within the enterprise network. If, at 245, the account owner was unknown or unresponsive, the corresponding service account or accounts may be flagged as having unknown or unresponsive owners at 250. These accounts may remain enabled for a second time period (e.g., 30 days, 45 days) to allow an owner to either be identified or to respond to the survey. If, at 255, the second time duration has not been met, the accounts remain active. If, at 255, the account owner remains unresponsive or unknown, and the second time duration has elapsed, the corresponding accounts are disabled at 260. Once disabled, the service accounts are removed from the monitoring activities performed by the activity scanning system 330 and/or the associated data may be archived.

At 260, for each disabled service account, a third disablement time threshold is used to ensure that the service account is no longer needed. In some cases, a user may determine that a service account has been erroneously disabled, and may request reactivation/restoration of the service account. If, at 265, a request to restore the service account has been received, the account status management system 340 may initiate an account restoration process to restore operation of the service account. For example, the account status management system 340 may autonomously cause the directory service server 310 to flip the enablement flag. Otherwise the account remains disabled. If, at 275, the disablement threshold (e.g., 90 days, 180 days, 200 days, etc.) has not been met, the service account remains disabled. If, at 275, the account status management system 340 determines that the disablement threshold time has elapsed, the account(s) associated with that threshold time may be deleted. This process may be continuously operated by the account status management system 340 such that the account status management system 340 tracks multiple thresholds, each associated with a different set of monitored or disabled accounts.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A method comprising:
   aggregating, automatically by service account monitoring engine, event activities of a plurality of service accounts on an enterprise network, wherein each service account comprises a machine user account in a user management system that enables autonomous operation of an autonomous job within the enterprise network and wherein operation of the autonomous job fails without a valid service account;
   determining, based on aggregated information associated with the event activities of the plurality of service accounts, an identity of a plurality of potentially dormant service accounts;
   verifying, automatically in response to generation of a listing of the plurality of potentially dormant service accounts, whether each potentially dormant service account is dormant or active;
   disabling, automatically based on a received confirmation input confirming dormancy of a first potentially dormant service account, monitoring of the first potentially dormant service account;
   disabling the first potentially dormant service account;
   re-enabling, based on failure of an autonomous job whose operation is reliant upon the first potentially dormant service account, the first potentially dormant service account; and
   decommissioning, at a directory service server and automatically based on expiration of a disablement time threshold, the first potentially dormant service account.

2. The method of claim 1 wherein aggregating event activities of the plurality of service accounts comprises:
   retrieving, via the enterprise network, event logs associated with service account activities associated with each application of a plurality of applications associated with the plurality of service accounts; and
   retrieving, via the enterprise network and from a directory service, service account event and activity records associated with each application of the plurality of applications.

3. The method of claim 2, wherein the plurality of service accounts comprises a subset of the plurality of service accounts and wherein the subset of service accounts comprises a listing of service accounts having an active status.

4. The method of claim 1, further comprising generating a historical data store of service account activities, the historical data store comprising event and activity information associated with each service account managed by a directory service.

5. The method of claim 4, wherein determining an identity of a plurality of potentially dormant service accounts comprises identifying, from historical aggregated event data, service accounts having no logged activity within a first defined time period.

6. The method of claim 5, wherein the first defined time period comprises 180 days.

7. The method of claim 1, further comprising:
   initiating, based on a re-enablement request, a re-enablement process to restore operation of a restored service account that had been previously disabled; and
   re-enabling monitoring of a restored service account based on receiving a re-enablement request input.

8. The method of claim 1, wherein a disablement event comprises setting an enablement flag within a directory service that is associated with a confirmed dormant service account and an enablement event comprises resetting the enablement flag.

9. A system comprising:
   a directory service managing a plurality of service accounts, each service account corresponding to an automated job within an enterprise network, wherein the automated job is inoperable without an associated and enabled service account; and
   a computing device comprising:
      a processor; and
      non-transitory memory storing instructions that, when executed by the processor, cause the computing device to:
         aggregate, automatically by a service account monitoring engine, event activities of a plurality of service accounts on an enterprise network, wherein each service account comprises a machine user account in a user management system that enables autonomous operation of a computerized process within the enterprise network;
         determine, based on aggregated information associated with the event activities of the plurality of service accounts, an identity of a plurality of potentially dormant service accounts;
         verify, automatically in response to generation of a listing of the plurality of potentially dormant service accounts, whether each potentially dormant service account is dormant or active;
         disable, automatically based on a received confirmation input confirming dormancy of a first potentially dormant service account, monitoring of the first potentially dormant service account;

re-enable, based on failure of an autonomous job whose operation is reliant upon the first dormant service account, the first potentially dormant service account; and decommission, automatically based on expiration of a disablement time threshold, the first potentially dormant service account.

10. The system of claim 9, wherein the instructions further cause the computing device to retrieve, via the enterprise network, event logs associated with service account activities associated with each application of a plurality of applications associated with the plurality of service accounts; and retrieve, via the enterprise network and from a directory service, service account event and activity records associated with each application of the plurality of applications.

11. The system of claim 10, wherein the plurality of service accounts comprises a subset of the plurality of service accounts and wherein the subset of service accounts comprises a listing of service accounts having an active status.

12. The system of claim 9, wherein the instructions further cause the computing device to generate a historical data store of service account activities, the historical data store comprising event and activity information associated with each service account managed by the directory service.

13. The system of claim 12, wherein the instructions further cause the computing device to identify, from historical aggregated event data, service accounts having no logged activity within a first defined time period.

14. The system of claim 13, wherein the first defined time period comprises 180 days.

15. The system of claim 9, wherein the instructions further cause the computing device to:

initiate, based on a re-enablement request, a re-enablement process to restore operation of a restored service account that had been previously disabled; and re-enable monitoring of a restored service account based on receiving a re-enablement request input.

16. The system of claim 9, wherein a disablement event comprises setting an enablement flag within the directory service that is associated with a confirmed dormant service account and an enablement event comprises resetting the enablement flag.

17. A non-transitory computer readable medium storing instructions that, when executed by a processor, cause a computing platform to:

aggregate, automatically by service account monitoring engine, event activities of a plurality of service accounts on an enterprise network, wherein each service account comprises a machine user account in a user management system that enables autonomous operation of an autonomous job within the enterprise network and wherein operation of the autonomous job fails without a valid service account;

determine, based on aggregated information associated with the event activities of the plurality of service accounts, an identity of a plurality of potentially dormant service accounts;

verify, automatically in response to generation of a listing of the plurality of potentially dormant service accounts, whether each potentially dormant service account is dormant or active;

disable, automatically based on a received confirmation input confirming dormancy of a first potentially dormant service account, monitoring of a first dormant service account;

re-enable, based on failure of an autonomous job whose operation is reliant upon the first dormant service account, the first dormant service account; and decommission, automatically based on expiration of a disablement time threshold, the first dormant service account.

18. The non-transitory computer readable medium of claim 17, wherein the instructions further cause the computing platform to retrieve, via the enterprise network, event logs associated with service account activities associated with each application of a plurality of applications associated with the plurality of service accounts; and retrieve, via the enterprise network and from a directory service, service account event and activity records associated with each application of the plurality of applications.

19. The non-transitory computer readable medium of claim 17, wherein the instructions further cause the computing platform to generate a historical data store of service account activities, the historical data store comprising event and activity information associated with each service account managed by a directory service.

20. The non-transitory computer readable medium of claim 17, wherein the instructions further cause the computing platform to:

initiate, based on a re-enablement request, a re-enablement process to restore operation of a restored service account that had been previously disabled; and re-enable monitoring of a restored service account based on receiving a re-enablement request input.

* * * * *